(12) United States Patent
Ichikawa (10) Patent No.: US 9,130,408 B2
(45) Date of Patent: Sep. 8, 2015

(54) NON CONTACT-POWER RECEIVING/TRANSMITTING DEVICE AND MANUFACTURING METHOD THEREFOR

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 745 days.

(21) Appl. No.: 13/515,950

(22) PCT Filed: Dec. 21, 2010

(86) PCT No.: PCT/IB2010/003316
§ 371 (c)(1),
(2), (4) Date: Jun. 14, 2012

(87) PCT Pub. No.: WO2011/077225
PCT Pub. Date: Jun. 30, 2011

(65) Prior Publication Data
US 2013/0038135 A1    Feb. 14, 2013

(30) Foreign Application Priority Data
Dec. 25, 2009   (JP) ................. 2009-295716

(51) Int. Cl.
*H01F 27/42*    (2006.01)
*H01F 37/00*    (2006.01)
(Continued)

(52) U.S. Cl.
CPC ............... *H02J 17/00* (2013.01); *B60L 11/182* (2013.01); *H01F 38/14* (2013.01); *H02J 5/005* (2013.01);
(Continued)

(58) Field of Classification Search
CPC ........... H02J 5/005; H02J 7/025; H02J 17/00; H01F 27/36

USPC .......................................................... 307/104
See application file for complete search history.

(56) References Cited

U.S. PATENT DOCUMENTS 5,831,841 A    11/1998   Nishino
2007/0064406 A1*  3/2007   Beart ........................... 361/816
(Continued)

FOREIGN PATENT DOCUMENTS

EP    2 345 553 A1    7/2011
JP    A-08-163792    6/1996
(Continued)

OTHER PUBLICATIONS

International Search Report issued in International Application No. PCT/IB2010/003316 dated Oct. 18, 2011.
(Continued)

*Primary Examiner* — Carlos Amaya
(74) *Attorney, Agent, or Firm* — Oliff PLC (57) ABSTRACT

A manufacturing method for a non-contact power receiving/transmitting device that transmits or receives electric power in a non-contact manner and that includes a coil unit and an electromagnetic shield, wherein the coil unit includes a self-resonance coil that is configured to receive or transmit electric power via an electromagnetic field generated through electromagnetic resonance and an adjusting unit that adjusts a resonance frequency of the self-resonance coil, the manufacturing method including: installing the coil unit; arranging the electromagnetic shield around the self-resonance coil except a direction in which electric power is received or transmitted; and adjusting the adjusting unit in accordance with a distance between the coil unit and a surface of the electromagnetic shield vertical to a direction of the electromagnetic field inside the self-resonance coil so that the resonance frequency becomes a predetermined frequency.

15 Claims, 6 Drawing Sheets

(51) Int. Cl.
  *H01F 38/00* (2006.01)
  *H02J 17/00* (2006.01)
  *B60L 11/18* (2006.01)
  *H01F 38/14* (2006.01)
  *H02J 5/00* (2006.01)
  *H01F 27/36* (2006.01)
  *H02J 7/02* (2006.01)

(52) U.S. Cl.
  CPC ............... *H01F 27/36* (2013.01); *H02J 7/025* (2013.01); *Y02T 10/7005* (2013.01); *Y02T 90/122* (2013.01); *Y02T 90/14* (2013.01); *Y10T 29/4902* (2015.01)

(56) References Cited

U.S. PATENT DOCUMENTS

| | | |
|---|---|---|
| 2007/0171681 A1 | 7/2007 | Baarman |
| 2009/0230777 A1 | 9/2009 | Baarman et al. |
| 2011/0025132 A1 | 2/2011 | Sato |

FOREIGN PATENT DOCUMENTS

| | | |
|---|---|---|
| JP | A-11-305848 | 11/1999 |
| JP | A-2005-101392 | 4/2005 |
| JP | A-2009-106136 | 5/2009 |
| WO | WO 2009/131121 A1 | 10/2009 |
| WO | WO 2010/041321 A1 | 4/2010 |
| WO | WO 2011/070637 A1 | 6/2011 |

OTHER PUBLICATIONS

Written Opinion issued in International Application No. PCT/IB2010/003316 dated Oct. 18, 2011.

Office Action issued in Japanese Application No. 2009-295716 dated Oct. 18, 2011 (with partial translation).

Office Action issued in Japanese Application No. 2009-295716 dated Oct. 25, 2011 (with partial translation).

* cited by examiner

NON CONTACT-POWER RECEIVING/TRANSMITTING DEVICE AND MANUFACTURING METHOD THEREFOR

BACKGROUND OF THE INVENTION

1. Field of the Invention

The invention relates to a non-contact power receiving/transmitting device and a manufacturing method therefor and, more particularly, to a non-contact power receiving/transmitting device of which the resonance frequency is adjustable by a resonance method and a manufacturing method therefor.

2. Description of the Related Art

In recent years, as an environmentally friendly vehicle, a vehicle that is equipped with an electrical storage device (for example, a secondary battery, a capacitor, or the like) and that is propelled by driving force generated from electric power stored in the electrical storage device becomes a focus of attention. Such a vehicle, for example, includes an electric vehicle, a hybrid vehicle, a fuel cell electric vehicle, and the like.

There is known a hybrid vehicle that is able to charge an in-vehicle electrical storage device from a power supply outside the vehicle as in the case of an electric vehicle. For example, there is known a so-called plug-in hybrid vehicle that is able to charge an electrical storage device using a power supply of an ordinary household in such a manner that a power supply wall outlet installed in a house is connected to a charging inlet provided for a vehicle via a charging cable.

On the other hand, in recent years, wireless electric power transmission that does not use a power cord or a power transmission cable becomes a focus of attention as an electric power transmission method. Three leading techniques are known as the wireless electric power transmission technique. The three leading techniques are electric power transmission using electromagnetic induction, electric power transmission using an electromagnetic wave and electric power transmission using a resonance method.

The resonance method is a non-contact electric power transmission technique such that a pair of resonators (for example, a pair of self-resonance coils) are resonated in an electromagnetic field (near field) to thereby transmit electric power via the electromagnetic field. The resonance method is able to transmit large electric power of several kilowatts over a relatively long distance (for example, several meters).

Japanese Patent Application Publication No. 2009-106136 (JP-A-2009-106136) describes a technique for wirelessly receiving charging electric power from a power supply outside a vehicle through a resonance method to thereby charge an electrical storage device equipped for the vehicle.

In addition, Japanese Patent Application Publication No. 8-163792 (JP-A-8-163792) describes a technique for reducing the size of a coil and increasing the efficiency of the coil using a ferrite core in connection with non-contact charging using electromagnetic induction.

In transmission of electric power in a non-contact manner using a resonance method, electric power is transmitted via an electromagnetic field as described above. In the resonance method, the distance of power transmission is relatively long, so it is presumable that the range of generated electromagnetic field is wider than that when electromagnetic induction is used.

The electromagnetic field generated around a coil unit including self-resonance coils may function as an electromagnetic noise for another electrical device, or the like, and, for example, it may be cause a noise of a radio, or the like. In addition, when a conductor is placed in the electromagnetic field, the conductor may be heated by electromagnetic induction caused by the electromagnetic field, so an increase in temperature may cause a failure of a device.

Therefore, in transmission of electric power using the resonance method, it is desirable to block a generated electromagnetic field in directions other than a direction in which electric power is transmitted or received, and a shield may be arranged around the coil unit.

In addition, when electric power is supplied using the resonance method, it may be necessary to reduce the size of the shield as much as possible in terms of mounting space of a vehicle.

SUMMARY OF INVENTION

The invention provides a non-contact power receiving/transmitting device that suppresses a decrease in transmission efficiency of electric power and an increase in size of a shield in non-contact reception or non-contact transmission of electric power using a resonance method, and a manufacturing method for the non-contact power receiving/transmitting device.

A first aspect of the invention provides a manufacturing method for a non-contact power receiving/transmitting device that transmits or receives electric power in a non-contact manner and that includes a coil unit and an electromagnetic shield, wherein the coil unit includes a self-resonance coil that is configured to receive or transmit electric power via an electromagnetic field generated through electromagnetic resonance and an adjusting unit that adjusts a resonance frequency of the self-resonance coil. The manufacturing method includes: installing the coil unit; arranging the electromagnetic shield around the self-resonance coil except a direction in which electric power is received or transmitted; and adjusting the adjusting unit in accordance with a distance between the coil unit and a surface of the electromagnetic shield vertical to a direction of the electromagnetic field inside the self-resonance coil so that the resonance frequency becomes a predetermined frequency.

The adjusting unit may include a capacitor that is connected to both ends of the self-resonance coil and of which a capacitance is variable.

The capacitor may include a first capacitor that has a fixed capacitance and a second capacitor that has a variable capacitance and that is connected in parallel to the first capacitor with respect to the self-resonance coil.

The capacitor may be arranged inside the self-resonance coil. The adjusting unit may include an inductance varying unit that is configured to vary an inductance of the self-resonance coil.

The inductance varying unit may include a variable coil that is connected in series to the self-resonance coil.

The shield may include a copper conductor.

A second aspect of the invention provides a non-contact power receiving/transmitting device that transmits or receives electric power in a non-contact manner. The non-contact power receiving/transmitting device includes: a self-resonance coil that is configured to receive or transmit electric power via an electromagnetic field generated through electromagnetic resonance; an electromagnetic shield that is arranged around the self-resonance coil except a direction in which electric power is received or transmitted; and an adjusting unit that adjusts a resonance frequency of the self-resonance coil in accordance with a distance between the self-resonance coil and a surface of the electromagnetic shield vertical to a direction of the electromagnetic field inside the self-resonance coil so that the resonance frequency of the self-resonance coil becomes a predetermined frequency.

The adjusting unit may include a capacitor that is connected to both ends of the self-resonance coil and of which a capacitance is variable.

The capacitor may include a first capacitor that has a fixed capacitance and a second capacitor that has a variable capacitance and that is connected in parallel to the first capacitor with respect to the self-resonance coil.

The capacitor may be arranged inside the self-resonance coil. The adjusting unit may include an inductance varying unit that is configured to vary an inductance the self-resonance coil.

The variable inductance unit may include a variable coil that is connected in series to the self-resonance coil.

According to the aspects of the invention, it is possible to provide a non-contact power receiving device that is used to receive electric power in a non-contact manner using a resonance method or a non-contact power transmitting device that is used to transmit electric power in a non-contact manner using a resonance The non-contact power receiving device and the non-contact power transmitting device according to the aspects of the invention are able to suppress a decrease in transmission efficiency of electric power and an increase in size of a shield.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings. Note that like reference numerals denote the same or corresponding components and the description thereof is not repeated.

Figure 1:
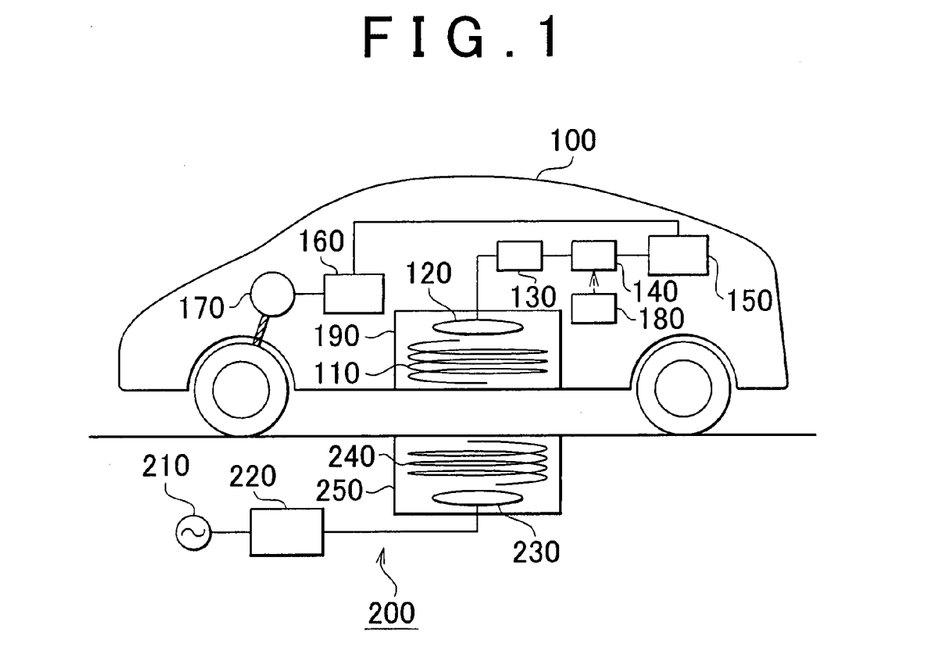
FIG. 1 is an overall configuration diagram of a non-contact power supply system that has a non-contact power receiving device according to an embodiment of the invention.

FIG. 1 is an overall configuration diagram of a non-contact power supply system that has a non-contact power receiving device according to the embodiment of the invention. As shown in FIG. 1, the non-contact power supply system includes a vehicle 100 and a power supply device 200. The vehicle 100 includes a secondary self-resonance coil 110, a secondary coil 120, a rectifier 130, a DC/DC converter 140, an electrical storage device 150 and a coil case 190. In addition, the vehicle 100 further includes a power control unit (hereinafter, also referred to as PCU) 160, a motor 170 and a vehicle electronic control unit (ECU) 180. The secondary self-resonance coil 110, the secondary coil 120 and the coil case 190 constitute the non-contact power receiving device.

The configuration of the vehicle 100 is not limited to the configuration shown in FIG. 1 as long as the vehicle 100 is driven by a motor. For example, the vehicle 100 may be a hybrid vehicle that includes a motor and an internal combustion engine, a fuel cell electric vehicle that includes a fuel cell, or the like.

The secondary self-resonance coil 110 is, for example, installed at the lower portion of a vehicle body. The secondary self-resonance coil 110 is an LC resonance coil of which both ends are not connected to each other. The secondary self-resonance coil 110 resonates with a primary self-resonance coil 240 (discussed later) of the power supply device 200 via an electromagnetic field to thereby receive electric power from the power supply device 200. Note that the capacitance component of the secondary self-resonance coil 110 may be a stray capacitance of the coil; instead, a capacitor (not shown) may be connected to both ends of the coil in order to obtain a predetermined capacitance.

The number of turns of the secondary self-resonance coil 110 is appropriately set so as to increase a Q value (for example, Q>100) that indicates the resonance strength between the primary self-resonance coil 240 and the secondary self-resonance coil 110, κ that indicates the degree of coupling between the primary self-resonance coil 240 and the secondary self-resonance coil 110, and the like, on the basis of the distance between the secondary self-resonance coil 110 and the primary self-resonance coil 240 of the power supply device 200, the resonance frequency of the primary self-resonance coil 240 and secondary self-resonance coil 110, and the like.

The secondary coil 120 is arranged coaxially with the secondary self-resonance coil 110, and is able to be magnetically coupled to the secondary self-resonance coil 110 by means of electromagnetic induction. The secondary coil 120 extracts electric power received by the secondary self-resonance coil 110 through electromagnetic induction and then outputs the extracted electric power to the rectifier 130.

The coil case 190 accommodates the secondary coil 120 and the secondary self-resonance coil 110 inside.

The rectifier 130 rectifies alternating-current electric power extracted by the secondary coil 120. On the basis of a control signal from the vehicle ECU 180, the DC/DC converter 140 converts electric power rectified by the rectifier 130 to electric power having the voltage level of the electrical storage device 150 and then outputs the converted electric power to the electrical storage device 150. Note that, when electric power is received from the power supply device 200 during running of the vehicle, the DC/DC converter 140 may convert electric power rectified by the rectifier 130 to electric power having a system voltage and then may directly supply the converted electric power to the PCU 160. In addition, the DC/DC converter 140 is not necessarily required; instead, after alternating-current electric power extracted by the secondary coil 120 is rectified by the rectifier 130, the electric power may be directly supplied to the electrical storage device 150.

The electrical storage device 150 is a rechargeable direct-current power supply, and is, for example, a secondary battery, such as a lithium ion battery and a nickel metal hydride battery. The electrical storage device 150 stores not only electric power supplied from the DC/DC converter 140 but also regenerative electric power generated by the motor 170. Then, the electrical storage device 150 supplies the stored electric power to the PCU 160. Note that a high-capacitance capacitor may be employed as the electrical storage device 150. The electrical storage device 150 may be any electric power buffer that is able to temporarily store electric power supplied from the power supply device 200 and/or regenerative electric power from the motor 170 and to supply the stored electric power to the PCU 160.

The PCU 160 drives the motor 170 with electric power output from the electrical storage device 150 or electric power directly supplied from the DC/DC converter 140. In addition, the PCU 160 rectifies regenerative electric power generated by the motor 170 and then outputs the electric power to the electrical storage device 150 to thereby charge the electrical storage device 150. The motor 170 is driven by the PCU 160 to generate vehicle driving force and then outputs the vehicle driving force to driving wheels. In addition, the motor 170 generates electric power with kinetic energy received from the driving wheels or an engine (not shown) in the case of a hybrid vehicle, and then outputs the generated regenerative electric power to the PCU 160.

The vehicle ECU 180 controls the DC/DC converter 140 when electric power is supplied from the power supply device 200 to the vehicle 100. The vehicle ECU 180, for example, controls the DC/DC converter 140 to adjust the voltage between the rectifier 130 and the DC/DC converter 140 to a predetermined target voltage. In addition, during running of the vehicle, the vehicle ECU 180 controls the PCU 160 on the basis of the running condition of the vehicle and/or the state of charge (also referred to as SOC) of the electrical storage device 150.

On the other hand, the power supply device 200 includes an alternating-current power supply 210, a high-frequency power driver 220, a primary coil 230, the primary self-resonance coil 240 and a coil case 250.

The alternating-current power supply 210 is a power supply outside the vehicle, and is, for example, a commercial power supply. The high-frequency power driver 220 converts electric power received from the alternating-current power supply 210 to high-frequency electric power, and supplies the converted high-frequency electric power to the primary coil 230. Note that the frequency of high-frequency electric power generated by the high-frequency power driver 220 is, for example, higher than or equal to 1 MHz and smaller than 20 MHz.

The primary coil 230 is arranged coaxially with the primary self-resonance coil 240, and is able to be magnetically coupled to the primary self-resonance coil 240 through electromagnetic induction. Then, the primary coil 230 supplies high-frequency electric power, supplied from the high-frequency power driver 220, to the primary self-resonance coil 240 through electromagnetic induction.

The primary self-resonance coil 240 is, for example, installed near the ground. The primary self-resonance coil 240 is also an LC resonance coil of which both ends are not connected to each other. The primary self-resonance coil 240 resonates with the secondary self-resonance coil 110 of the vehicle 100 via an electromagnetic field to thereby transmit electric power to the vehicle 100. Note that the capacitance component of the primary self-resonance coil 240 is also a stray capacitance of the coil; instead, a capacitor (not shown) may be connected to both ends of the coil as in the case of the secondary self-resonance coil 110.

The number of turns of the primary self-resonance coil 240 is appropriately set so as to increase the Q value (for, example, Q>100), the degree of coupling κ, and the like, on the basis of the distance between the primary self-resonance coil 240 and the secondary self-resonance coil 110 of the vehicle 100, the resonance frequency of the primary self-resonance coil 240 and secondary self-resonance coil 110, and the like.

The coil case 250 accommodates the primary coil 230 and the primary self-resonance coil 240 inside.

Figure 2:
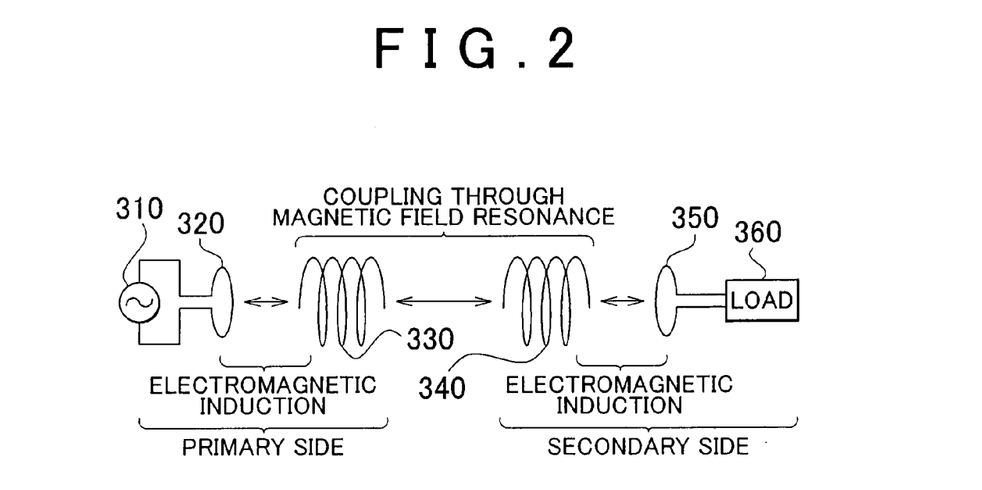
FIG. 2 is a view for illustrating the principle of transmission of electric power using a resonance method.

FIG. 2 is a view for illustrating the principle of transmission of electric power using a resonance method. Referring to FIG. 2, in the resonance method, as in the case where two tuning forks resonate with each other, two LC resonance coils having the same natural frequency resonate with each other in an electromagnetic field (near field) to thereby transmit electric power from one of the coils to the other one of the coils.

Specifically, a primary coil 320 is connected to a high-frequency power supply 310 to thereby supply high-frequency electric power that is higher than or equal to 1 MHz and smaller than 20 MHz through electromagnetic induction to a primary self-resonance coil 330 that is magnetically coupled to the primary coil 320. The primary self-resonance coil 330 functions as an LC resonator formed of the inductance and stray capacitance (including capacitance when the capacitor is connected to the coil) of the coil itself, and resonates via an electromagnetic field (near field) with a secondary self-resonance coil 340 having the same resonance frequency as the primary self-resonance coil 330. Then, energy (electric power) is transferred from the primary self-resonance coil 330 to the secondary self-resonance coil 340. Energy (electric power) transferred to the secondary self-resonance coil 340 is extracted by a secondary coil 350 that is magnetically coupled to the secondary self-resonance coil 340 through electromagnetic induction, and is supplied to a load 360. Note that electric power transmission using the resonance method is achieved when the Q value that indicates the resonance strength between the primary self-resonance coil 330 and the secondary self-resonance coil 340 is, for example, higher than 100.

The correspondence relationship with FIG. 1 will be described. The alternating-current power supply 210 and the high-frequency power driver 220 in FIG. 1 correspond to the high-frequency power supply 310 in FIG. 2. In addition, the primary coil 230 and the primary self-resonance coil 240 in FIG. 1 respectively correspond to the primary coil 320 and the primary self-resonance coil 330 in FIG. 2. The secondary self-resonance coil 110 and the secondary coil 120 in FIG. 1 respectively correspond to the secondary self-resonance coil 340 and the secondary coil 350 in FIG. 2. Then, the rectifier 130 and the subsequent components are comprehensively shown as the load 360.

Figure 3:
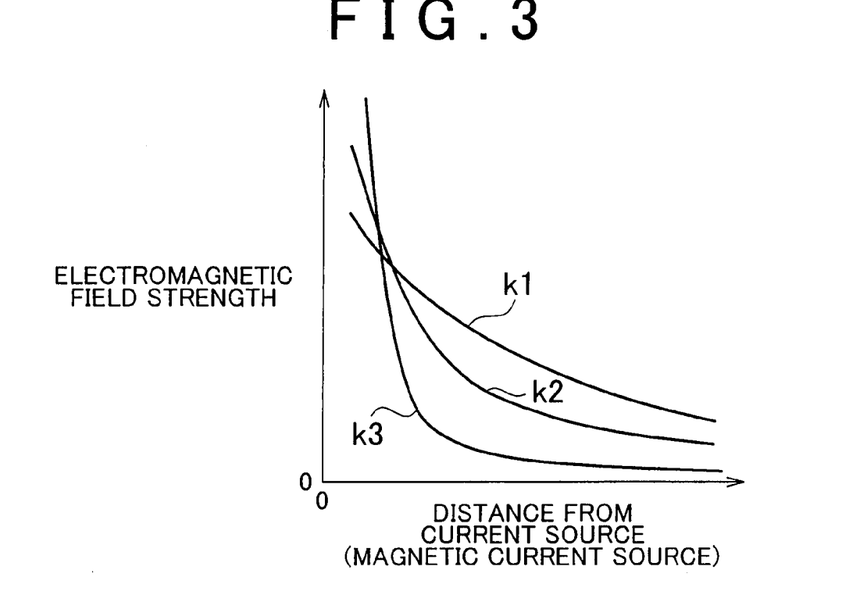
FIG. 3 is a graph that shows the relationship between the distance from a current source (magnetic current source) and the strength of electromagnetic field.

FIG. 3 is a graph that shows the relationship between the distance from a current source (magnetic current source) and the strength of electromagnetic field. As shown in FIG. 3, the electromagnetic field consists of three components. The curve k1 is a component that is inversely proportional to the distance from a wave source, and is called radiation electromagnetic field. The curve k2 is a component that is inversely proportional to the square of the distance from the wave source, and is called induction electromagnetic field. In addition, the curve k3 is a component that is inversely proportional to the cube of the distance from the wave source, and is called static electromagnetic field.

The static electromagnetic field is a region in which the strength of electromagnetic wave steeply decreases with an increase in distance from the wave source, and the resonance method utilizes the near field (evanescent field) in which the static electromagnetic field is predominant to thereby transmit energy (electric power). That is, in the near field in which the static electromagnetic field is predominant, a pair of resonators (for example, a pair of LC resonance coils) having the same natural frequency are resonated with each other to transmit energy (electric power) from one of the resonators (primary self-resonance coil) to the other one of the resonators (secondary self-resonance coil). The static electromagnetic field does not propagate energy over a long distance, so the resonance method is able to transmit electric power with less loss of energy in comparison with an electromagnetic wave that transmits energy (electric power) through the radiation electromagnetic field that propagates energy over a long distance.

Figure 4:
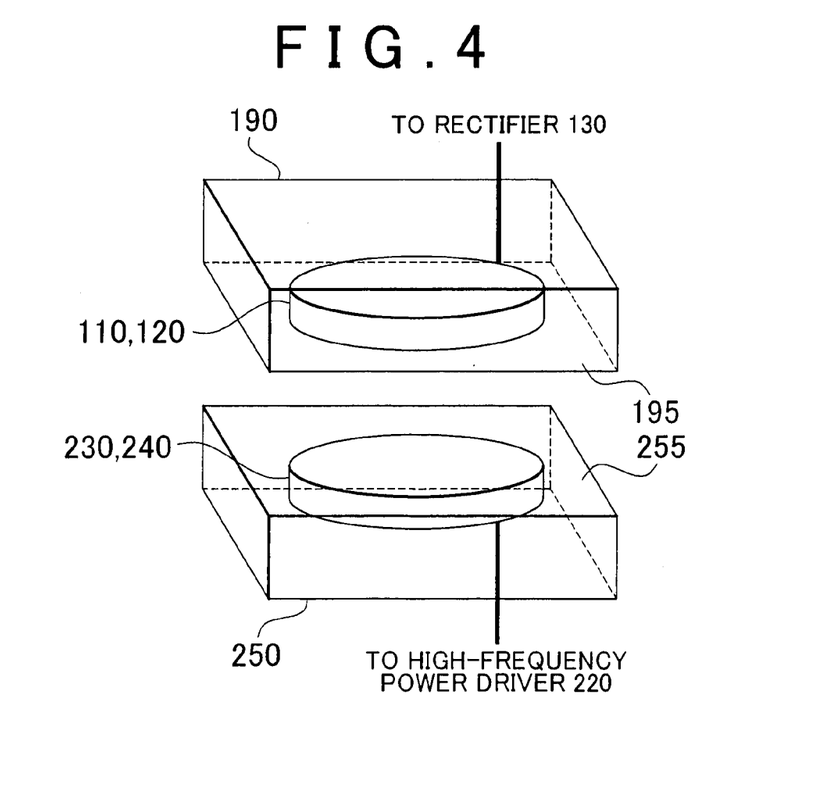
FIG. 4 is a view for illustrating the structure of coil cases shown in FIG. 1.

FIG. 4 is a view for illustrating the structures of the coil cases 190 and 250 in detail. Note that, in FIG. 4, a receiving coil unit (hereinafter, also referred to as "power receiving unit") that is formed to include the secondary self-resonance coil 110 and the secondary coil 120 is simply illustrated in a circular cylindrical shape. In addition, similarly, a transmitting coil unit (hereinafter, also referred to as "power transmitting unit") that is formed to include the primary self-resonance coil 240 and the primary coil 230 is also simply illustrated in a circular cylindrical shape.

As shown in FIG. 4, the coil case 190 is, for example, formed in a box shape having an opening 195, and is arranged so that the opening 195 faces the power transmitting unit. The area of the opening 195 is larger than or equal to the areas of the other sides of the coil case 190. An electromagnetic shield (hereinafter, also referred to as "shield") (not shown) is attached to the five sides other than the opening 195 so as to cover the inner surface of the coil case 190 in order to prevent a resonant electromagnetic field (near field), which is generated around the power receiving unit when electric power is received from the power transmitting unit, from leaking to around the coil case 190. The shield is made of a low-impedance material, such as thin copper foil. Note that the coil case 190 itself may be formed of the shield.

Then, the power receiving unit that is formed to include the secondary self-resonance coil 110 and the secondary coil 120 is arranged inside the coil case 190, and the power receiving unit receives electric power from the power transmitting unit via the opening 195 of the coil case 190. Note that the reason why the opening 195 arranged to face the power transmitting unit is formed to have an area larger than or equal to those of the other sides of the coil case 190 is to ensure the transmission efficiency from the power transmitting unit to the power receiving unit as much as possible.

The coil case 250 is also, for example, formed in a box shape having an opening 255, and is arranged so that the opening 255 faces the power receiving unit. The area of the opening 255 is larger than or equal to the areas of the other sides of the coil case 250. A shield is attached to the five sides other than the opening 255 so as to cover the inner surface of the coil case 250 in order to prevent a resonant electromagnetic field, which is generated around the power transmitting unit when electric power is transmitted, from leaking to around the coil case 250.

Then, the power transmitting unit that is formed to include the primary self-resonance coil 240 and the primary coil 230 is arranged inside the coil case 250, and the power transmitting unit transmits electric power to the power receiving unit via the opening 255 of the coil case 250. Note that the reason why the opening 255 arranged to face the power receiving unit is formed to have an area larger than or equal to those of the other sides of the coil case 250 is also to ensure the transmission efficiency from the power transmitting unit to the power receiving unit as much as possible.

Note that the shape of each of the coil cases 190 and 250 is not limited to the shape of which the cross section is rectangular as shown in FIG. 4; the shape may be a circular, an elliptical or a polygonal other than rectangular.

Figure 5:
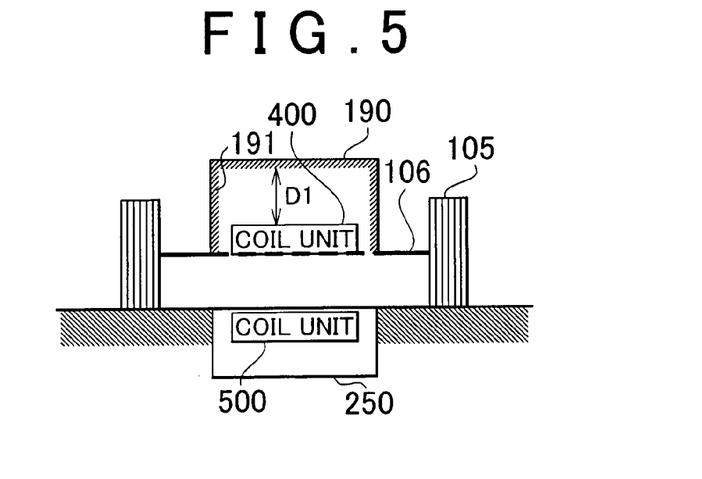
FIG. 5 is a first view for illustrating the positional relationship between a coil unit and the coil case in a vehicle.
Figure 6:
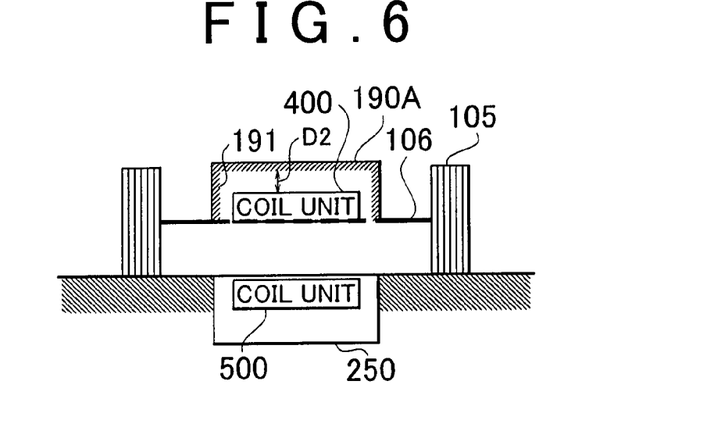
FIG. 6 is a second view for illustrating the positional relationship between the coil unit and a coil case in the vehicle.
Figure 7:
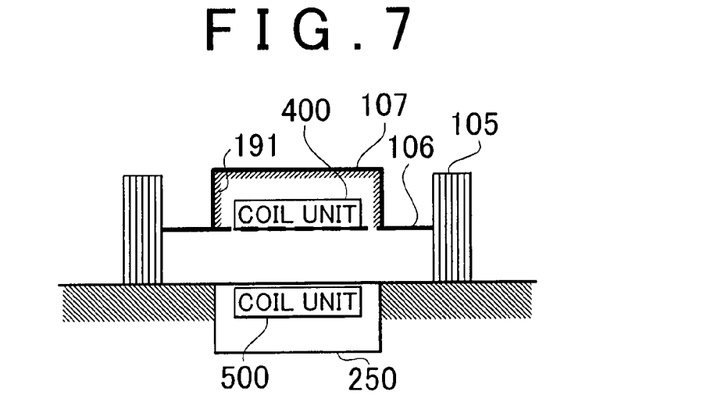
FIG. 7 is a third view for illustrating the positional relationship between the coil unit and a coil case in the vehicle.

FIG. 5 is a view for illustrating the positional relationship between a power receiving unit 400 and the coil case 190 in the vehicle 100. FIG. 5, and FIG. 6 and FIG. 7 (discussed later), show a cross-sectional view taken vertically to the direction in which the vehicle travels.

Referring to FIG. 5, the power receiving unit 400 equipped for the vehicle 100 is arranged so that a surface facing a power transmitting unit 500 is substantially level with a bottom surface 106 of a vehicle body with respect to the ground. The distance between the power receiving unit 400 and the ground (that is, the power transmitting unit 500 of the power supply device 200) is determined on the basis of the positional relationship between driving wheels 105 of the vehicle and the bottom surface 106 of the vehicle.

The coil case 190 is arranged on the bottom surface 106 of the vehicle so as to cover the power receiving unit 400. In addition, a shield 191 is attached to the inner surface of the coil case 190. The distance (D1 in FIG. 5) between the coil case 190 and the power receiving unit 400 may be limited by the mounting space of the vehicle like a coil case 190A shown in FIG. 6. Alternatively, the vehicle is not configured so that a separate coil case is attached; it is also applicable that the bottom surface of the vehicle body has a recess 107 that can accommodate the power receiving unit 400 as shown in FIG. 7, a shield is attached to the inner surface of the recess 107 and, by so doing, the recess 107 functions as the coil case.

Figure 8:
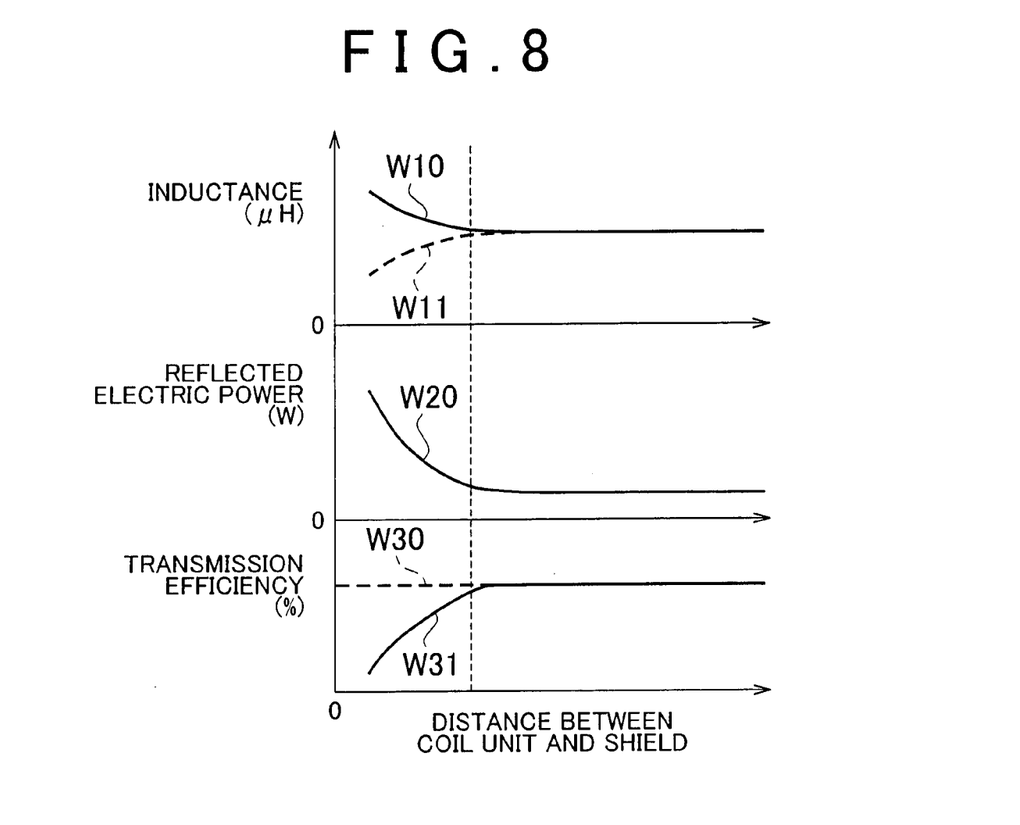
FIG. 8 is a graph that shows the relationship between the size of the coil case and the transmission efficiency.

FIG. 8 shows the relationship between the size of the coil case and the transmission efficiency. The abscissa axis represents the distance between the coil unit and the coil case (that is, the shield), and the ordinate axis represents the inductance of the coil unit, reflected electric power returning to the power transmitting unit and the transmission efficiency of electric power.

As shown in FIG. 8, when the distance between the coil unit and the shield is large, the inductance of the self-resonance coil in the coil unit indicates substantially a constant value. However, as the distance between the coil unit and the shield reduces, the magnetic permeability of the self-resonance coil varies because of the shield, so the inductance increases like the curve W10 or reduces like the curve W11 as shown in FIG. 8. Note that the variation of the inductance depends on the material of the shield.

Here, the resonance frequency f of the self-resonance coil may be expressed by the mathematical expression (1) where the inductance of the coil is L and the reactance is C.

$$f = 1/\{2\pi \cdot (LC)^{1/2}\} \qquad (1)$$

Therefore, as the inductance L varies, the resonance frequency of the self-resonance coil varies accordingly. When the impedance of the power transmitting unit and the impedance of the power receiving unit are unmatched and, as a result, the resonance frequency deviates, reflected electric power that cannot be transferred to the power receiving device within electric power transmitted from the power supply device increases like the curve W20 shown in FIG. 8.

The transmission efficiency E (%) of the power supply system is expressed by the percentage of a received electric power Pr to a transmitted electric power Pt like the mathematical expression (2), and the received electric power Pr is obtained by subtracting a reflected electric power P1 that cannot be transmitted and a loss P2 that is consumed in the coil or the shield from the transmitted electric power Pt.

$$E=Pr/Pt\times100=(Pt-P1-P2)/Pt\times100 \qquad (2)$$

Therefore, as reflected electric power increases, the transmission efficiency of electric power also decreases accordingly (W31 in FIG. 8) in comparison with the case where no shield is provided (W30 in FIG. 8).

In the resonance method, in the power supply system shown in FIG. 1, the self-resonance coil 240 in the power transmitting unit 500 resonates with the self-resonance coil 110 in the power receiving unit 400 at a predetermined resonance frequency to thereby transmit electric power. At this time, for the power supply device 200, the resonance frequency of the power transmitting unit 500 may be basically fixed so as to be able to transmit electric power to various types of vehicles.

In addition, in the power receiving unit 400 of the vehicle 100 as well, it is conceivable that a coil unit of the same type is employed for different vehicles for the purpose of cost reduction. Therefore, as described above, in the case of a vehicle in which the distance between the power receiving unit 400 and the shield 191 is limited, there is a possibility that the transmission efficiency remarkably decreases.

Then, in the present embodiment, by using the non-contact power receiving device having the coil unit that is able to adjust the resonance frequency in accordance with the distance between the coil unit and the shield in the non-contact power supply system using the resonance method, it is possible to reduce the size of the coil case while suppressing a decrease in transmission efficiency of electric power.

Figure 9:
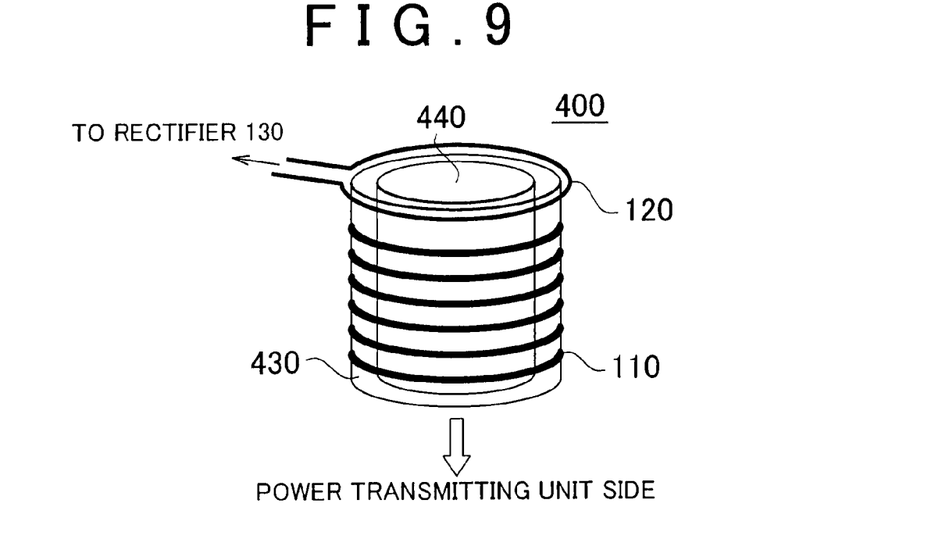
FIG. 9 is an outline view of a power receiving unit.

FIG. 9 shows an outline view of the power receiving unit 400. As shown in FIG. 9, the power receiving unit 400 includes the secondary self-resonance coil 110, the secondary coil 120, a bobbin 430 and a capacitor 440.

The secondary self-resonance coil 110 is wound along the outer periphery or inner periphery of the bobbin 430. The secondary coil 120 is arranged coaxially with the bobbin 430 and the secondary self-resonance coil 110. Then, as shown in FIG. 9, the secondary self-resonance coil 110 is generally arranged nearer the power transmitting unit than the secondary coil 120 is.

The capacitor 440 is a variable capacitor of which the capacitance is variable, and is arranged inside the bobbin 430. The capacitor 440 is connected to both ends of the secondary self-resonance coil 110, and constitutes an LC resonance circuit.

Figure 10:
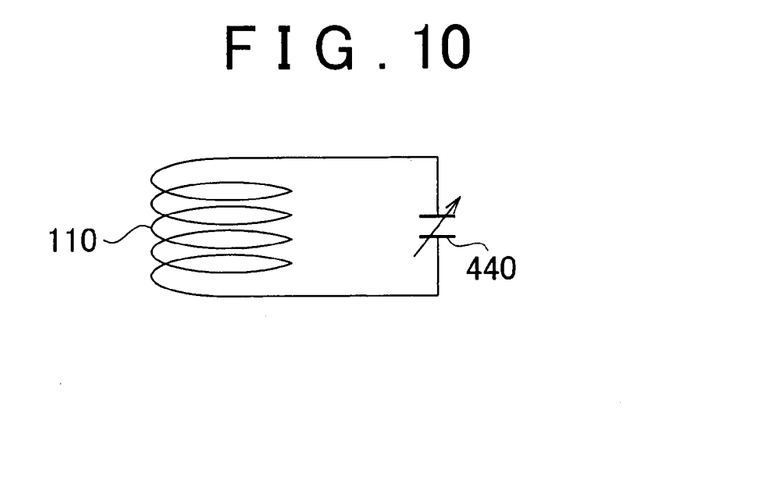
FIG. 10 is a view that shows an example of a circuit of the power receiving unit according to the embodiment.

FIG. 10 shows the circuit of the power receiving unit 400 according to the present embodiment. The capacitor 440 is connected to both ends of the secondary self-resonance coil 110. As can be understood from the above mathematical expression (1), the resonance frequency may be adjusted by varying the capacitance of the capacitor 440. Therefore, when the distance between the shield 191 and the coil unit 400 reduces and, as a result, the inductance of the secondary self-resonance coil 110 varies, the capacitance of the capacitor 440 is varied so as to compensate for the variation to thereby make it possible to maintain the resonance frequency at a predetermined frequency. Note that, when the distance between the shield 191 and the coil unit 400 is varied at the designing stage, the specifications may be changed so as to employ a secondary self-resonance coil having a different stray capacitance in place of varying the capacitance of the capacitor 440.

Figure 11:
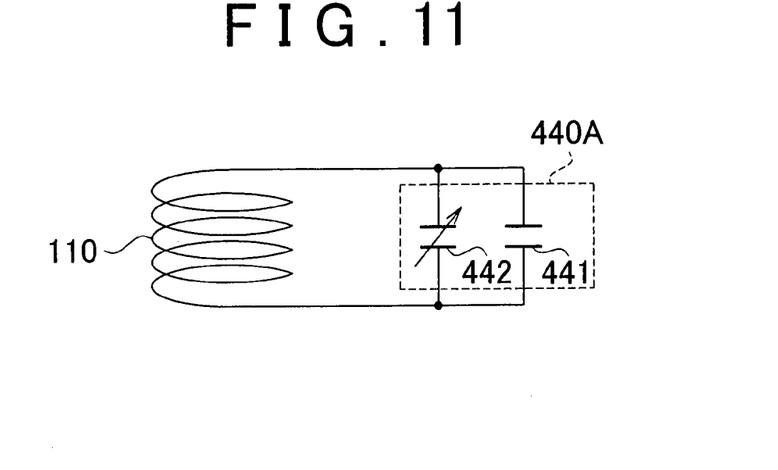
FIG. 11 is a view that shows another example of the circuit of the power receiving unit according to the embodiment.

Note that the capacitor 440 may be modified so that a capacitor 441 having a fixed capacitance and a capacitor 442 having a variable capacitance are connected in parallel with respect to the secondary self-resonance coil 110 like a capacitor 440A shown in FIG. 11.

The resonance frequency of the power receiving unit 400 is basically designed so as to coincide with the resonance frequency of the power transmitting unit, so, when the resonance frequency is determined, a predetermined capacitor capacitance corresponding to the reference inductance of the secondary self-resonance coil 110 is determined. Therefore, a range that can compensate for the inductance that varies with the distance between the coil unit and the shield basically suffices the variable range of the capacitor capacitance. In addition, the variation range may be set so as to be able to compensate for variations in distance between the power transmitting unit and the power receiving unit. Generally, the price of a capacitor having a variable capacitance is mostly more expensive than the price of a capacitor having a fixed capacitance. Therefore, as shown in FIG. 11, by using the low-capacitance variable capacitor 442 having a variable range required in correspondence with a variation in inductance and a high-capacitance fixed capacitor 441 having a capacitance close to a predetermined capacitance determined in correspondence with a reference inductance, it may be expected to reduce cost in comparison with the case where the high-capacitance variable capacitor 440 having a large variable range is provided as shown in FIG. 10.

Figure 12:
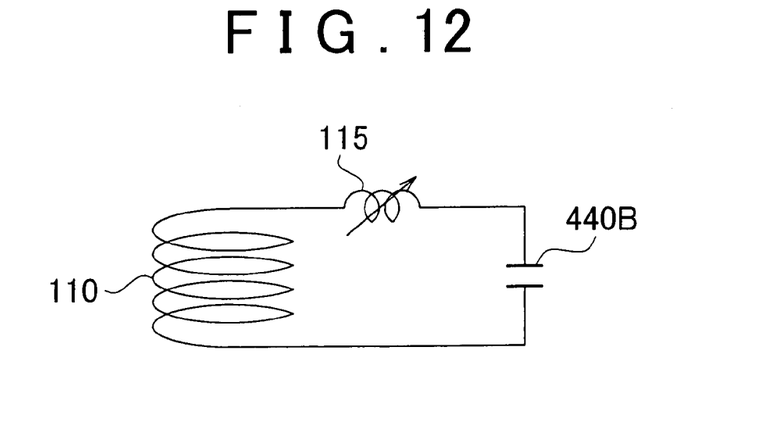
FIG. 12 is a view that shows a further other example of the circuit of the power receiving unit according to the embodiment.

In addition, as shown in FIG. 12, the capacitor may be a fixed capacitor 440B, and a variable coil 115 of which the inductance is variable may be connected in series between the secondary self-resonance coil 110 and the capacitor 440B. In this case, the resonance frequency may be adjusted by varying the inductance. Furthermore, both a variable capacitor and a variable coil may be provided.

Figure 13:
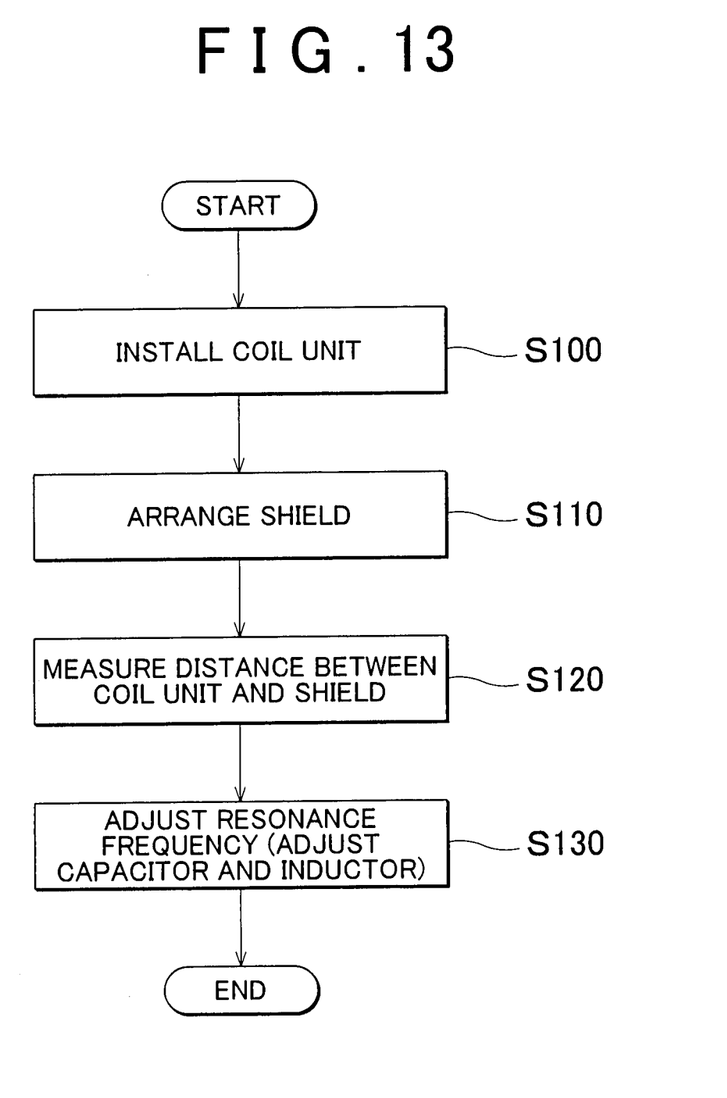
FIG. 13 is a flowchart for illustrating the processes of a manufacturing method for the non-contact power receiving device according to the embodiment.

FIG. 13 is a flowchart for illustrating the processes of a manufacturing method for a non-contact power receiving device that includes a power receiving unit of which the resonance frequency is adjustable. In FIG. 13, the processes are shown in steps (hereinafter, step is abbreviated to S).

In the manufacturing method for the non-contact power receiving device according to the present embodiment, first, in S100, the power receiving unit 400 is installed on the vehicle body.

Subsequently, in S110, the coil case 190 to which the shield 191 is attached is arranged on the vehicle body. Note that, when the coil case is formed of the vehicle body itself as described in FIG. 7, the shield 191 is attached to the vehicle body.

After that, in S120, the distance between the power receiving unit 400 and the shield 191 is measured.

Then, in S130, a map, or the like, that is set in advance through an experiment is used to vary the capacitance of the capacitor 440 and/or the inductance of the variable coil 115 in accordance with the distance between the power receiving unit 400 and the shield 191. By so doing, the resonance frequency is adjusted.

Note that, when the resonance frequency is adjusted in S130, for example, the capacitance of the capacitor 440, or the like, may be adjusted so as to maximize received electric power while measuring the magnitude of the received electric power by actually transmitting electric power from the power supply device.

As described above, the power receiving unit of which the resonance frequency is adjustable is used to manufacture the non-contact power receiving device in accordance with the processes shown in FIG. 13. By so doing, the resonance frequency that varies as the distance between the power receiving unit and the shield reduces may be adjusted so as to match the resonance frequency of the power transmitting unit. As a result, it is possible to reduce the size of the shield while suppressing a decrease in transmission efficiency of electric power when electric power is supplied.

Note that, in the above description, the manufacturing method for the non-contact power receiving device equipped for the vehicle is described; however, the manufacturing method may also be similarly applied to a non-contact power transmitting device of the power supply device. That is, the resonance frequency of the power transmitting unit may be adjusted to a predetermined frequency in accordance with the distance between the power transmitting unit and coil case of the power supply device.

Note that the capacitors 440 and 440A and the variable coil 115 according to the present embodiment are examples of an adjusting unit according to the aspect of the invention. The variable coil 115 according to the present embodiment is an example of an inductance varying unit according to the aspect of the invention.

The embodiment described above is illustrative and not restrictive in all respects. The scope of the invention is defined by the appended claims rather than the above description. The scope of the invention is intended to encompass all modifications within the scope of the appended claims and equivalents thereof.

The invention claimed is:

1. A manufacturing method for a non-contact power receiving/transmitting device that transmits or receives electric power in a non-contact manner and that includes a coil unit and an electromagnetic shield, wherein the coil unit includes a self-resonance coil that is configured to receive or transmit electric power via an electromagnetic field generated through electromagnetic resonance and an adjusting unit that adjusts a resonance frequency of the self-resonance coil, the manufacturing method comprising:
   installing the coil unit;
   arranging the electromagnetic shield around the self-resonance coil except a direction in which electric power is received or transmitted; and
   adjusting the adjusting unit in accordance with a distance between the coil unit and a surface of the electromagnetic shield vertical to a direction of the electromagnetic field inside the self-resonance coil so that the resonance frequency becomes a predetermined frequency.

2. The manufacturing method for a non-contact power receiving/transmitting device according to claim 1, wherein the adjusting unit includes a capacitor that is connected to both ends of the self-resonance coil and of which a capacitance is variable.

3. The manufacturing method for a non-contact power receiving/transmitting device according to claim 2, wherein the capacitor includes a first capacitor that has a fixed capacitance and a second capacitor that has a variable capacitance and that is connected in parallel to the first capacitor with respect to the self-resonance coil.

4. The manufacturing method for a non-contact power receiving/transmitting device according to claim 2, wherein the capacitor is arranged inside the self-resonance coil.

5. The manufacturing method for a non-contact power receiving/transmitting device according to claim 2, wherein the resonance frequency is adjusted by varying the capacitance of the capacitor.

6. The manufacturing method for a non-contact power receiving/transmitting device according to claim 1, wherein the adjusting unit includes an inductance varying unit that is configured to vary an inductance of the self-resonance coil.

7. The manufacturing method for a non-contact power receiving/transmitting device according to claim 6, wherein the inductance varying unit includes a variable coil that is connected in series to the self-resonance coil.

8. The manufacturing method for a non-contact power receiving/transmitting device according to claim 6, wherein the resonance frequency is adjusted by varying the inductance of the self-resonance coil.

9. The manufacturing method for a non-contact power receiving/transmitting device according to claim 1, wherein the electromagnetic shield includes a copper conductor.

10. A non-contact power receiving/transmitting device that transmits or receives electric power in a non-contact manner, comprising:
    a self-resonance coil that is configured to receive or transmit electric power via an electromagnetic field generated through electromagnetic resonance;
    an electromagnetic shield that is arranged around the self-resonance coil except a direction in which electric power is received or transmitted; and
    an adjusting unit that adjusts a resonance frequency of the self-resonance coil in accordance with a distance between the self-resonance coil and a surface of the electromagnetic shield vertical to a direction of the electromagnetic field inside the self-resonance coil so that the resonance frequency of the self-resonance coil becomes a predetermined frequency.

11. The non-contact power receiving/transmitting device according to claim 10, wherein
    the adjusting unit includes a capacitor that is connected to both ends of the self-resonance coil and of which a capacitance is variable.

12. The non-contact power receiving/transmitting device according to claim 11, wherein
    the capacitor includes a first capacitor that has a fixed capacitance and a second capacitor that has a variable capacitance and that is connected in parallel to the first capacitor with respect to the self-resonance coil.

13. The non-contact power receiving/transmitting device according to claim 11, wherein
    the capacitor is arranged inside the self-resonance coil.

14. The non-contact power receiving/transmitting device according to claim 10, wherein
    the adjusting unit includes an inductance varying unit that is configured to vary an inductance of the self-resonance coil.

15. The non-contact power receiving/transmitting device according to claim 14, wherein
    the inductance varying unit includes a variable coil that is connected in series to the self-resonance coil.

* * * * *